C. E. COLDWELL.
CLEANING ATTACHMENT FOR ROLLER GINS.
APPLICATION FILED NOV. 27, 1918.

1,326,441.

Patented Dec. 30, 1919.
2 SHEETS—SHEET 1.

Inventor
C. E. Coldwell
By Watson E. Coleman
Attorney

C. E. COLDWELL.
CLEANING ATTACHMENT FOR ROLLER GINS.
APPLICATION FILED NOV. 27, 1918.
1,326,441.
Patented Dec. 30, 1919.
2 SHEETS—SHEET 2.
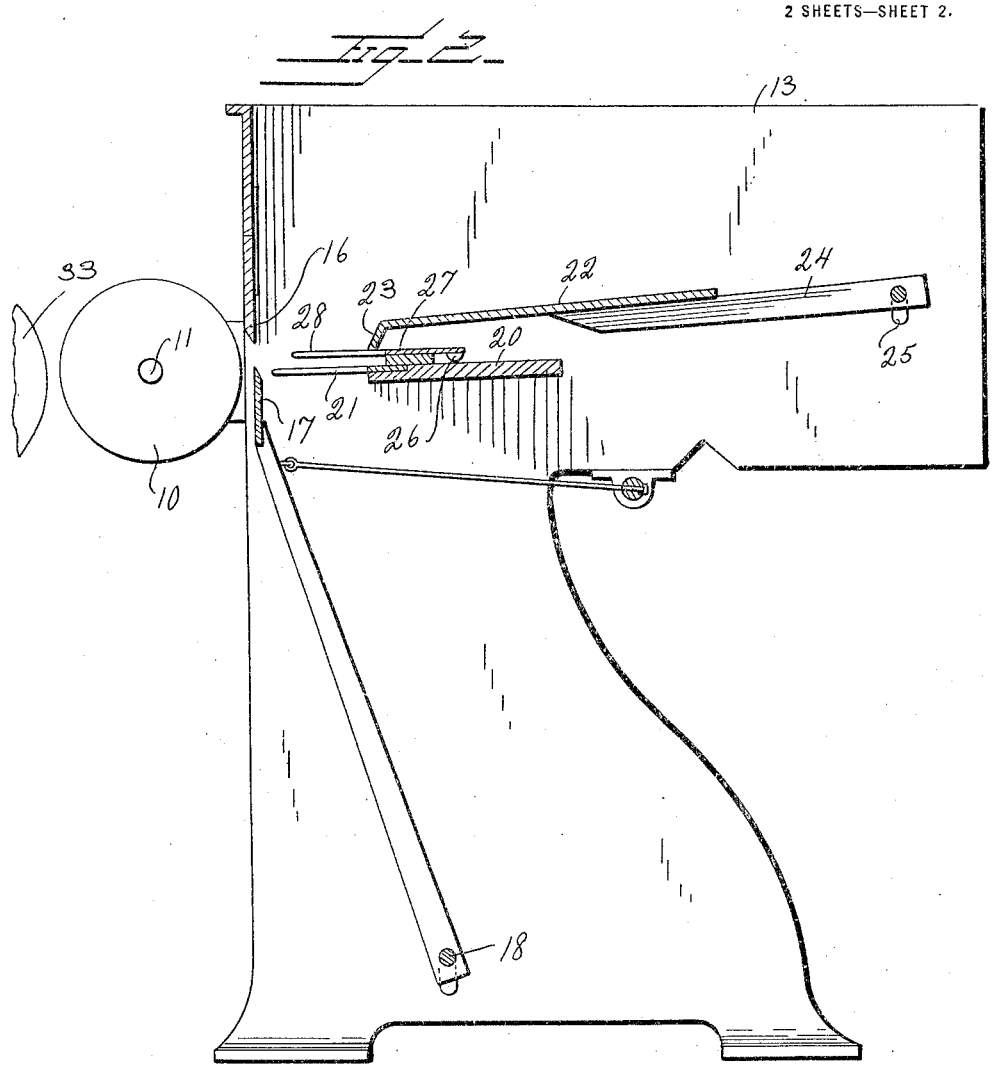
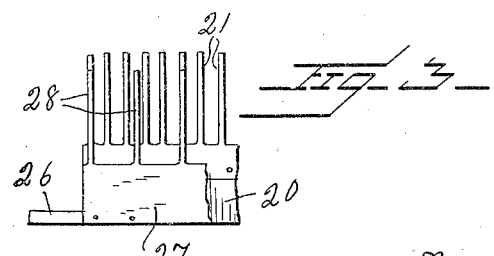
Inventor
C. E. Coldwell
By Watson E. Coleman
Attorney

UNITED STATES PATENT OFFICE.

CHARLES E. COLDWELL, OF TEMPE, ARIZONA, ASSIGNOR TO SOUTHWEST COTTON COMPANY, OF PHOENIX, ARIZONA, A CORPORATION OF ARIZONA.

CLEANING ATTACHMENT FOR ROLLER-GINS.

1,326,441.  Specification of Letters Patent.  Patented Dec. 30, 1919.

Application filed November 27, 1918. Serial No. 264,391.

*To all whom it may concern:*

Be it known that I, CHARLES E. COLDWELL, a citizen of the United States, residing at Tempe, in the county of Maricopa and State of Arizona, have invented certain new and useful Improvements in Cleaning Attachments for Roller-Gins, of which the following is a specification, reference being had to the accompanying drawings.

This invention relates to cotton gins, and particularly to cotton gins of the roller type and the invention is particularly designed for use in ginning Arizona cotton wherein there is a very high percentage of lint remaining on the cotton seeds after the roller has completed its work and wherein this lint tends to cause the seed to "ball up" and form a mass on the grid instead of passing through as the seed should.

The general object of this invention is to provide means for so agitating the mass of seed in front of the roller as to break up any attachment which may be formed between the seeds and so agitate it as to permit the seed to pass through the grid much more freely than is now the case.

A further object is to prevent the banking of seed along in front of the roller and coincidently act to distribute the seed cotton evenly in front of the knives.

Other objects will appear in the course of the following description.

My invention is illustrated in the accompanying drawings, wherein:—

Fig. 2 is a vertical sectional view more or less diagrammatic in character showing my invention applied to the gin;

Fig. 3 is a fragmentary top plan view of the fixed grate and its tines and the reciprocating comb or agitator.

Figure 1:
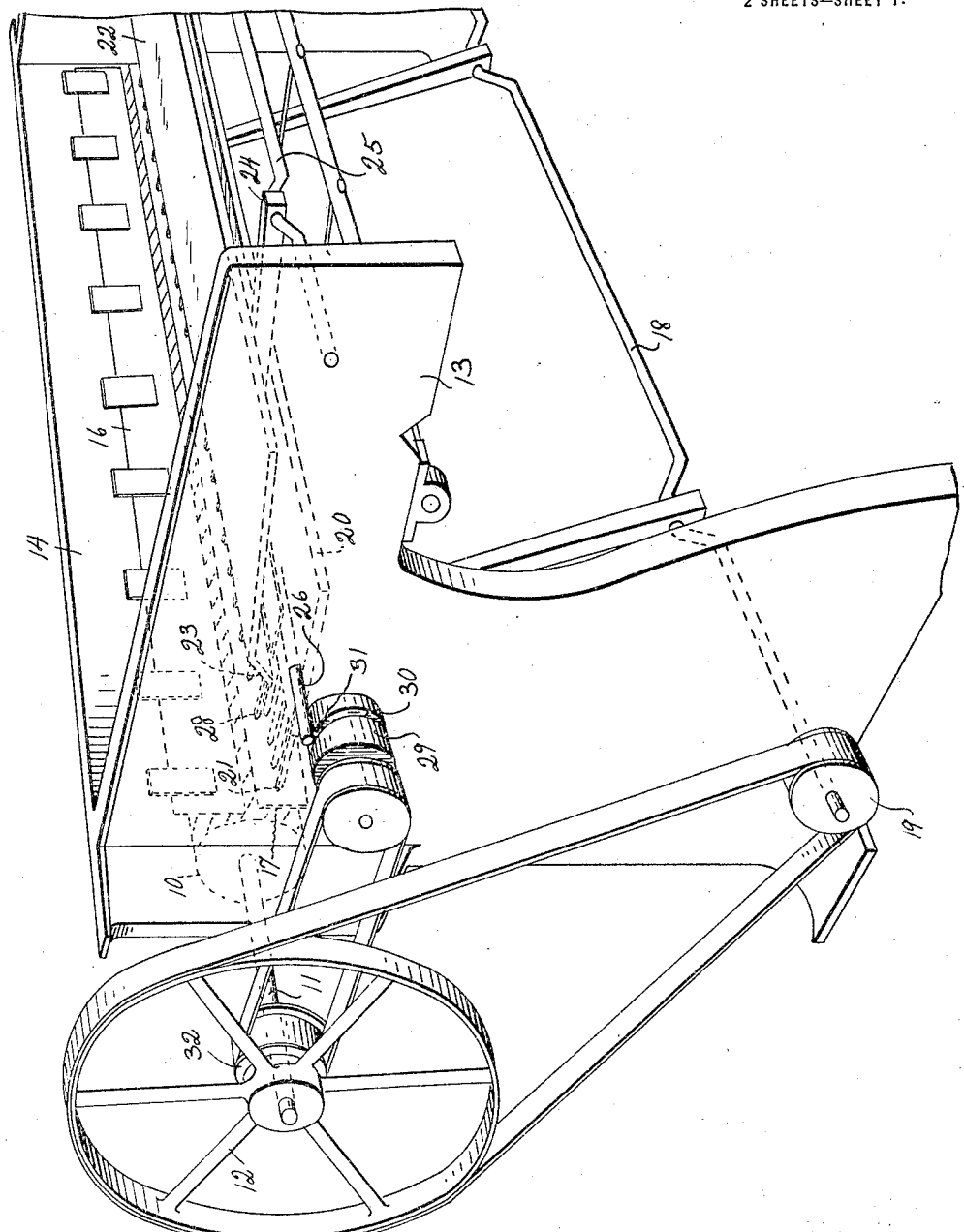
Figure 1 is a fragmentary perspective view of a roller gin of a certain type with my improvement applied thereto.

In the drawing, I have illustrated a particular type of roller gin of well known form which in general needs no description. In this drawing, 10 designates the drawing roller of the gin which is mounted upon a shaft 11 carrying a belt wheel 12, this shaft being driven in any suitable manner. The shaft is mounted upon the frame 13 having the side pieces 14 and the back piece 15. Mounted upon the back piece 15 is the vertical knife 16 and coacting with this knife is a vertically reciprocating knife 17 of any usual or suitable construction. This knife 17 I have illustrated as being reciprocated by means of a crank shaft 18 driven by a band wheel 19 from the band wheel 12 but I do not wish to be limited to this as it forms no part of my invention.

Mounted between the side members 14 is a grate 20 which is provided with the comb or grid 21, the tines of which extend out toward the path of the lower knife. Disposed above the grate or grid 20 is the pushboard 22 which at its forward end is downwardly and forwardly inclined as at 23. This pushboard is mounted for reciprocation toward or from the knife and to this end the pushboard is carried upon arms 24 which in turn are connected to a crank shaft 25 rotated by power, in any suitable manner. All of these parts are of any usual or suitable construction and form no part of my invention.

Disposed between the pushboard and the grate is my improved grid cleaner and agitator. This consists of a longitudinally extending rod 26 which rests upon the grate 20 and which carries upon it a plate 27 having extending therefrom the tines 28. This plate 27 is riveted or otherwise fastened to the rod 26 and preferably the tines are spaced about twice the distance of the tines of the fixed grate and are somewhat shorter than the tines of the fixed grate. I have illustrated the comb or agitator 27 as being longitudinally reciprocated by means of a cam 29 having therein a cam track 30 with which a roller 31 on the rod 26 engages. This cam is driven by means of a belt from a band wheel 32 on the shaft 11.

It will be seen that with this construction the pushboard reciprocating toward and from the knives pushes the cotton forward as the knives shift toward each other and that the lint of the cotton is engaged by the roller 10 and drawn through between the knives detaching the lint from the seeds and carrying the lint around to the gathering roller or wiping roller 33 which I have illustrated in Fig. 2.

As the pushboard reciprocates to thus feed the cotton forward, the cleaner comb or agitator also reciprocates longitudinally of the machine and so distributes the cotton that it is presented evenly to the roller 10 and so agitates the cotton and the cotton seed that the seeds will not tend to form a mass on the grid but that the seed will pass through the grid and drop down into the usual conveyer, thus leaving a free path for the unginned cotton to be pushed toward the knives and roller.

As before stated, the peculiar difficulty encountered in ginning Arizona cotton is that there is a higher percentage of lint adhering to the seed after the main body of the lint has been detached than there is with other kinds of cotton. As a consequence, the seeds are liable to ball up and form a mass on the grid instead of passing through the grate or grid as they should. The reciprocation of the comb, however, acts to prevent this balling up or massing of the seed in front of the knives and roller and causes the delinted seed to drop down into the conveyer and clears the way for the unginned seed. Furthermore, as before stated, it tends to uniformly distribute the unginned seed in front of the roller.

While I have illustrated a particular type of roller cotton gin, I wish it understood that this is purely illustrative and that my device may be applied to other types of roller gin and that many minor modifications might be made without departing from the spirit of the invention.

It will be understood that I have not illustrated a complete roller cotton gin as the construction of such a gin is very well known and my invention only relates to the agitator and cleaner for the feeding table.

I claim:—

1. A roller gin including in combination a roller, knives coacting therewith, a stationary grid having tines extending toward the roller, an agitator and cleaner comprising a comb resting upon the grid and having teeth extending over the tines of the grid, said comb being reciprocatable in a direction parallel to the roller, and a push board extending downward over the comb but terminating short of the teeth of said comb, and means for reciprocating the push board toward and from the roller.

2. A roller gin including in combination a roller, knives coacting therewith, a push board, a grid having tines extending toward the roller, an agitator and cleaner, comprising a comb disposed between the push board and the grid and having tines projecting toward the roller, and means for reciprocating the grid in a direction parallel to the roller, the tines of the comb being spaced a greater distance apart than the tines of the push board.

3. A roller gin including a supporting frame, a gin roller, coacting knives disposed in front of the gin roller, a fixed grid having tines projecting toward the knives, a push board mounted upon the frame above the fixed grid and having a downwardly extending inner margin, means for reciprocating the push board toward and from the grid, and a grid cleaner comprising a comb mounted between the fixed grid and the push board and having tines extending over the tines of the grid and toward the roller, and power operated means for reciprocating the comb.

In testimony whereof I hereunto affix my signature in the presence of two witnesses.

CHARLES E. COLDWELL.

Witnesses:
 A. B. HINKLE, Jr.,
 G. P. NEVITT.